(12) United States Patent
Fromm

(10) Patent No.: US 8,919,690 B1
(45) Date of Patent: Dec. 30, 2014

(54) FISHING LINE MANAGEMENT SYSTEM

(76) Inventor: Perry E. Fromm, Fox Lake, WI (US)

( * ) Notice: Subject to any disclaimer, the term of this patent is extended or adjusted under 35 U.S.C. 154(b) by 414 days.

(21) Appl. No.: 13/473,551

(22) Filed: May 16, 2012

(51) Int. Cl.
B65H 75/18 (2006.01)

(52) U.S. Cl.
USPC ......... 242/601; 242/390.8; 242/609; 242/902

(58) Field of Classification Search
USPC ............. 242/902, 390.8, 390.9, 405.3, 486.6, 242/597.4, 597.6, 601, 602, 603, 609
See application file for complete search history.

(56) References Cited

U.S. PATENT DOCUMENTS

| 3,261,569 | A | * | 7/1966 | Bedell | 242/136 |
| 3,493,105 | A | * | 2/1970 | Greb et al. | 206/401 |
| 4,007,886 | A | * | 2/1977 | Kaminstein | 242/486.8 |
| 4,196,864 | A | | 4/1980 | Cole | |
| 4,901,939 | A | * | 2/1990 | Obst et al. | 242/118.4 |
| 4,948,064 | A | * | 8/1990 | Richard | 242/423.2 |
| 4,951,890 | A | | 8/1990 | Sossamon | |
| 5,376,035 | A | | 12/1994 | Forrest | |
| 5,906,329 | A | | 5/1999 | Wesley, Sr. | |
| D423,073 | S | | 4/2000 | Campbell | |
| 6,102,319 | A | | 8/2000 | Annabel et al. | |
| 6,398,147 | B1 | | 6/2002 | Fredrickson | |
| 6,550,712 | B1 | | 4/2003 | Peterpaul | |
| 6,648,262 | B1 | | 11/2003 | Huffman | |
| 2004/0035973 | A1 | | 2/2004 | Henrion | |

* cited by examiner

Primary Examiner — William A Rivera

(57) ABSTRACT

A fishing line management system for fishing line spool storage, winding new fishing line onto a reel, and removing old fishing line from the reel has a generally hollow cylindrical housing. A hollow cavity in the cylindrical housing is sized to receive spools of fishing line. The cylindrical housing has an internally threaded open end for receiving an externally threaded lid with a rubber seal for making the cylindrical housing watertight. The cylindrical housing has a rod centrally located in the hollow cavity for receiving a spool of fishing line. The system has a generally cylindrical flexible outer sleeve with an annular center rib located between a first outer sleeve open end and a second outer sleeve open end. The outer sleeve is for receiving fishing line from a fishing pole.

3 Claims, 5 Drawing Sheets

FISHING LINE MANAGEMENT SYSTEM

BACKGROUND OF THE INVENTION

Angling is a method of fishing using a fish hook (angle) attached to fishing line. Many different types of fishing line can be used varying in length, material of manufacture and weight (thickness) which affect performance characteristics. The present invention features a fishing line management system for fishing line spool storage, winding new fishing line onto a reel, and removing old fishing line from the reel.

SUMMARY

The present invention features a fishing line management system for fishing line spool storage, winding new fishing line onto a reel, and removing old fishing line from the reel. In some embodiments, the system comprises a generally hollow cylindrical housing. In some embodiments, a hollow cavity in the cylindrical housing is sized to receive a plurality of spools of fishing line located inside. In some embodiments, the cylindrical housing comprises an internally threaded open end for receiving an externally threaded lid. In some embodiments, the threaded lid comprises a rubber seal located thereon for making the cylindrical housing watertight. In some embodiments, the cylindrical housing comprises a rod centrally located in the hollow cavity for receiving a spool of fishing line.

In some embodiments the system comprises a line spool holder. In some embodiments, the line spool holder can be used as an anchor for a buoy marker.

In some embodiments, the system comprises a generally cylindrical flexible outer sleeve. In some embodiments, the outer sleeve comprises an annular center rib located between a first outer sleeve open end and a second outer sleeve open end. In some embodiments, the outer sleeve is for receiving fishing line from a fishing pole.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
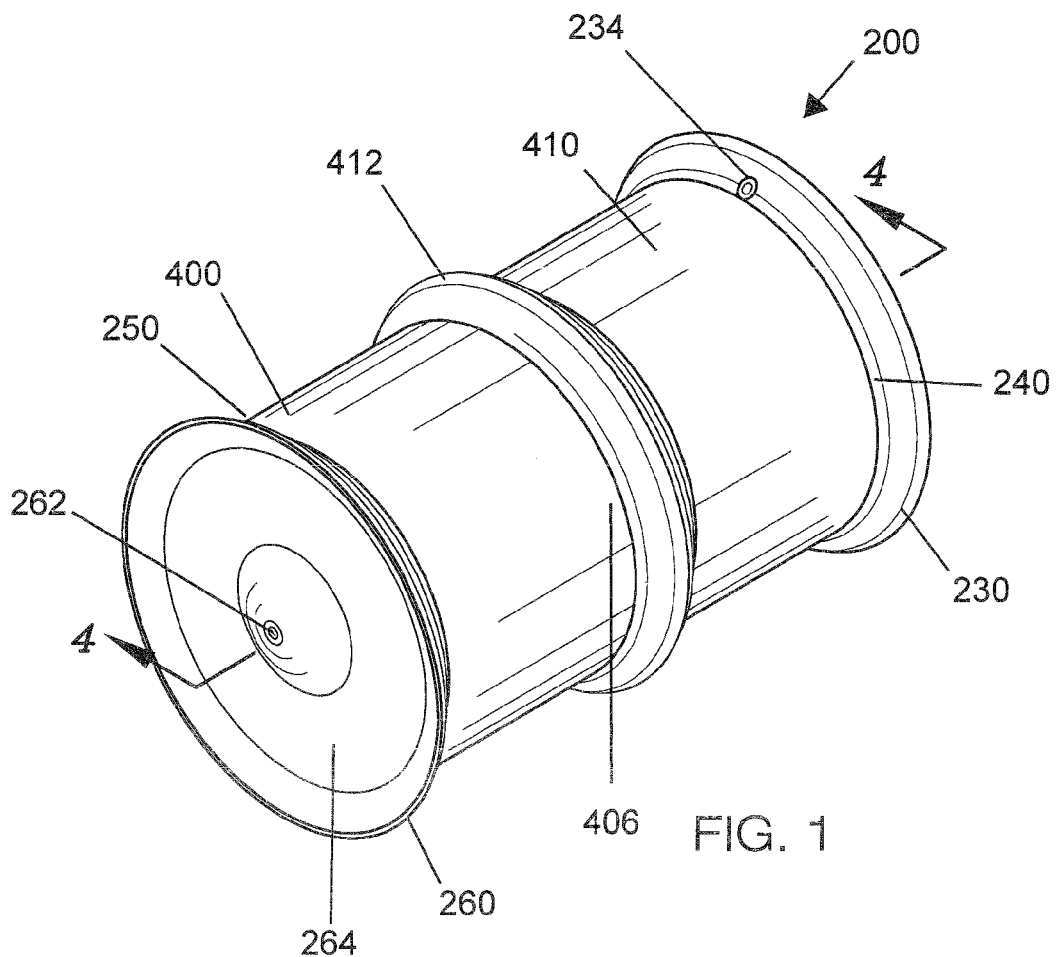
FIG. 1 is a perspective view of the cylindrical housing of the present invention.
Figure 2:
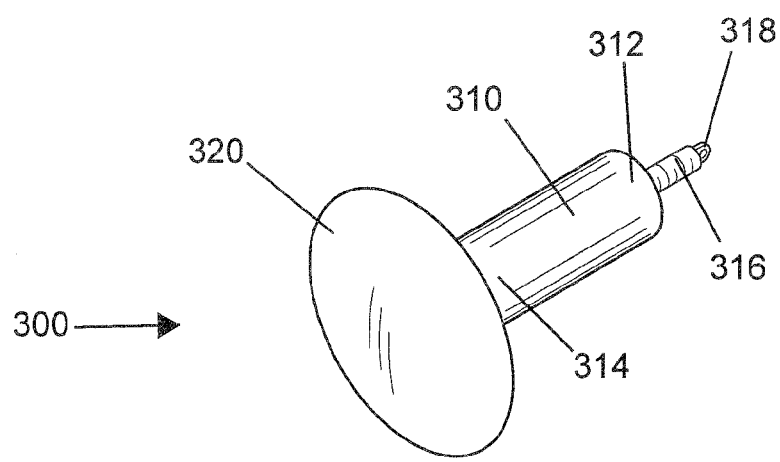
FIG. 2 is a perspective view of the line spool holder of the present invention.
Figure 3:
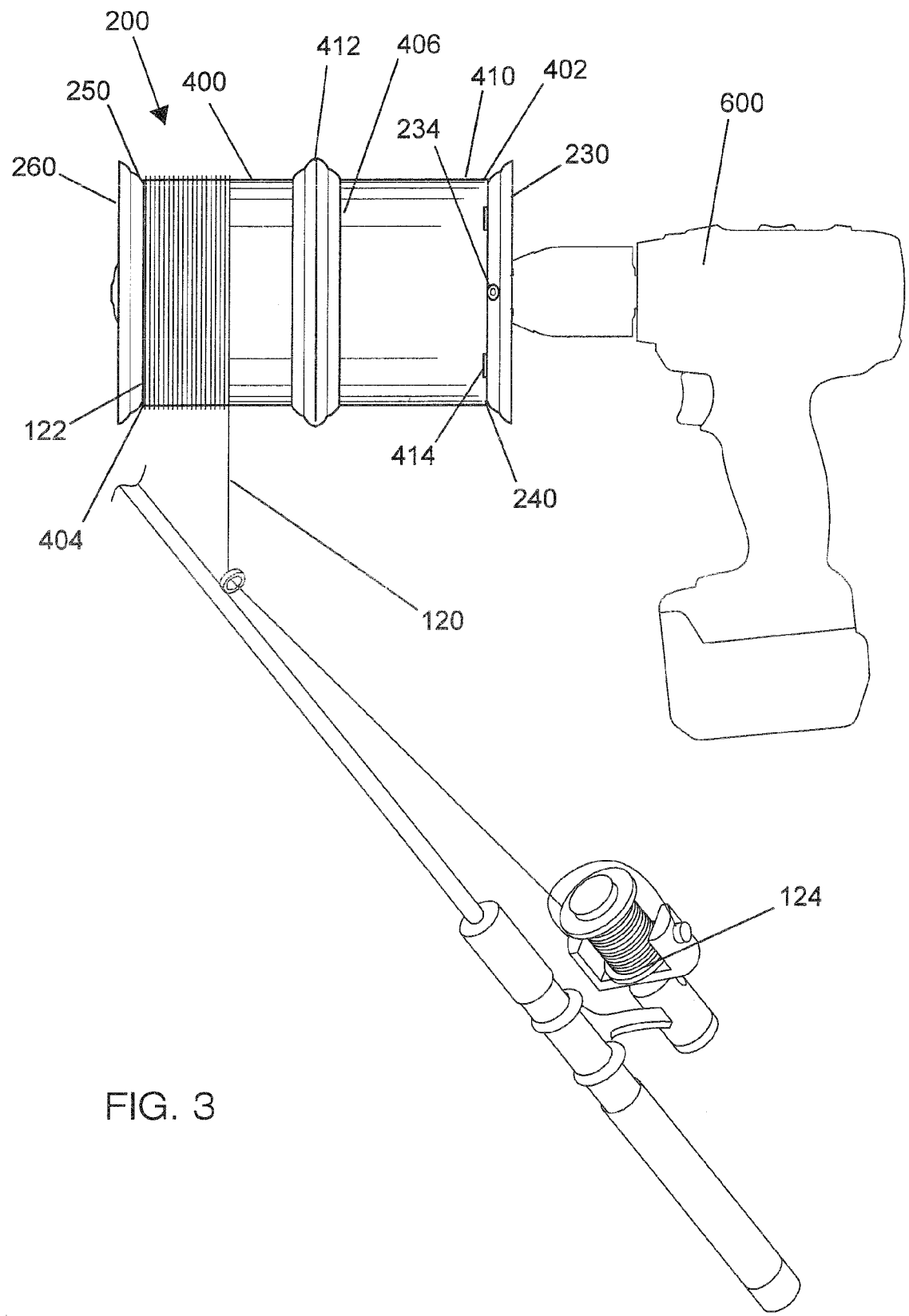
FIG. 3 is a side view of the present invention.
Figure 4:
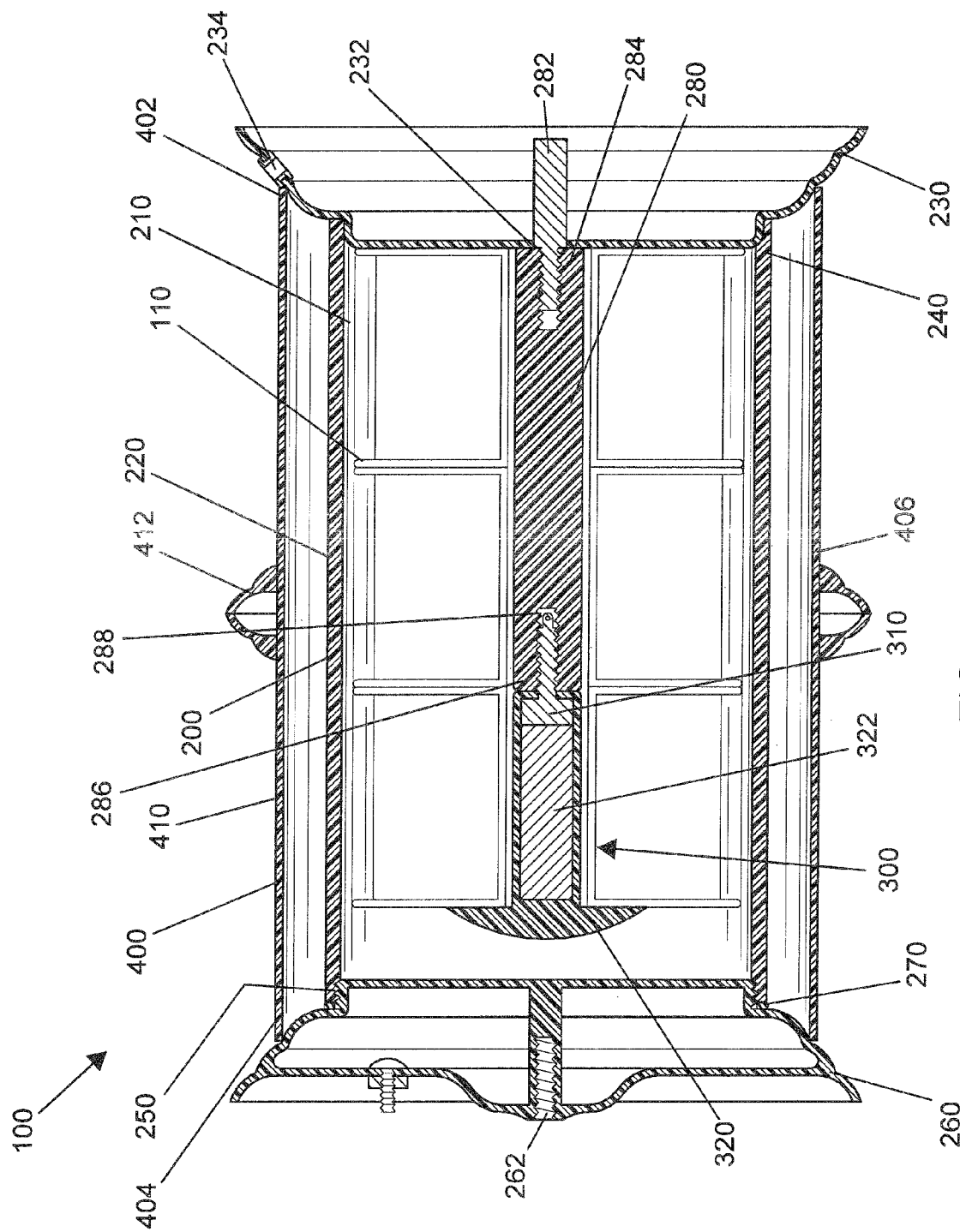
FIG. 4 is a cross-sectional view in a coronal plane of the present invention.
Figure 5:
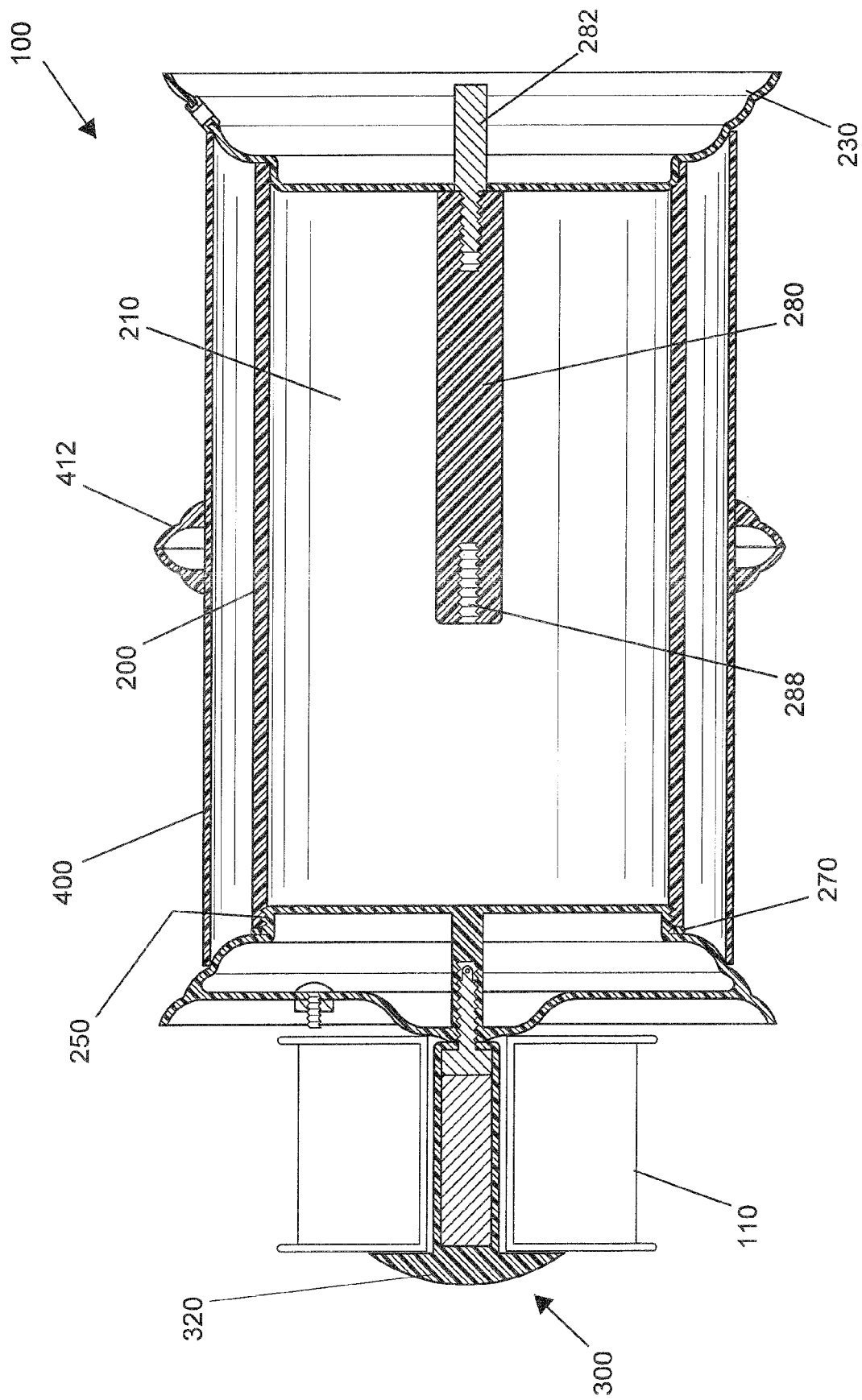
FIG. 5 is a cross-sectional view in a coronal plane of the present invention.
Figure 6:
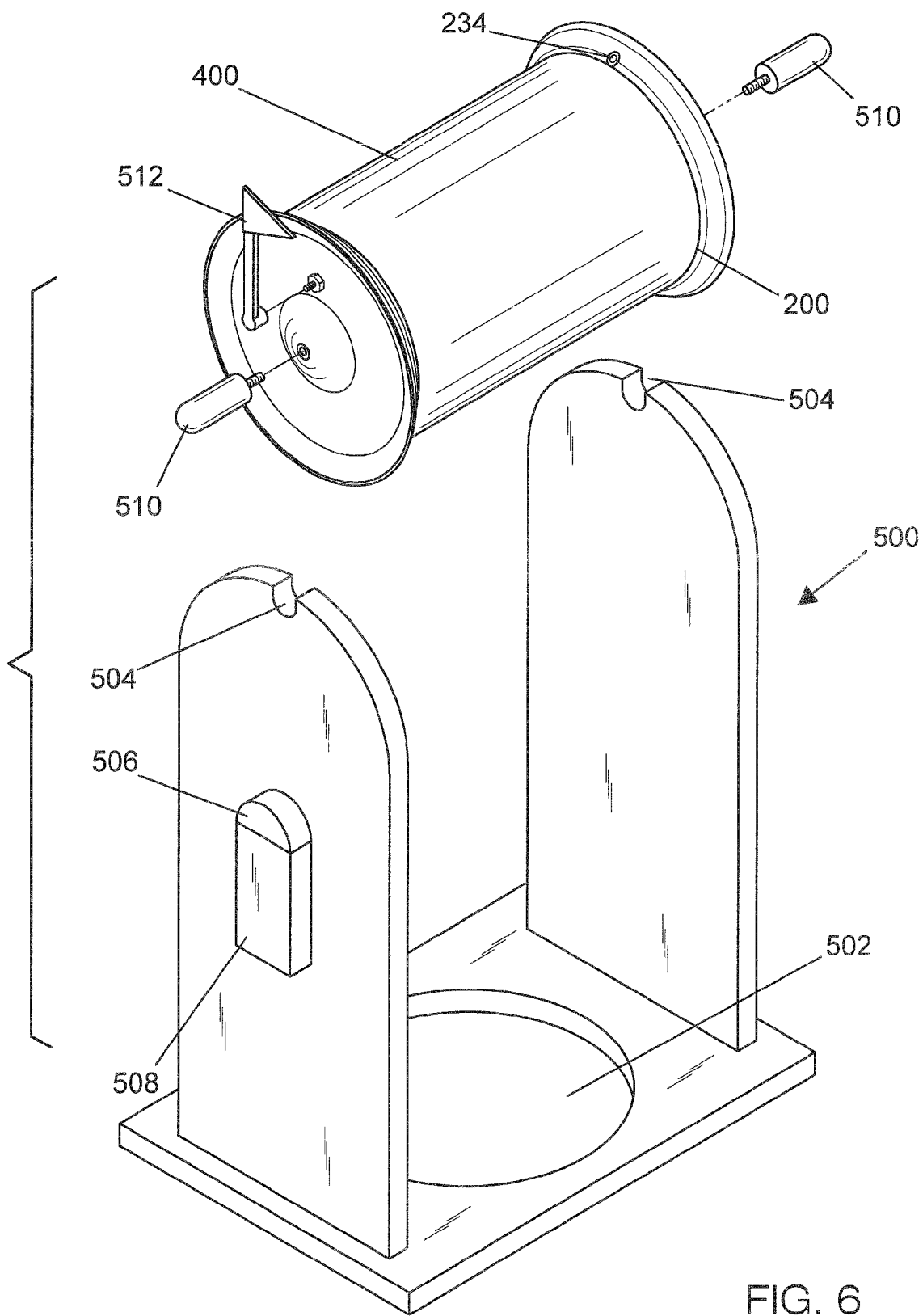
FIG. 6 is a perspective view of an alternate embodiment of the present invention.

Following is a list of elements corresponding to a particular element referred to herein:
100 Fishing line management system
110 Fishing line spool
120 Fishing line
122 Fishing line first end
124 Fishing line second end
200 Cylindrical housing
210 Hollow cavity
220 Housing side wall
230 Housing base
232 Base aperture
234 Fishing line attachment point
240 Housing first end
250 Housing second end
260 Housing lid
262 Housing lid threaded insert
264 Housing lid exterior surface
270 Seal
280 Rod
282 Arbor
284 First rod end
286 Second rod end
288 Rod cavity
300 Line spool holder
310 Line spool holder shaft
312 Line spool holder shaft first end
314 Line spool holder shaft second end
316 Line spool holder threaded rod
318 Eyelet
320 Shoulder
322 Weight
400 Outer sleeve
402 First outer sleeve open end
404 Second outer sleeve open end
406 Outer sleeve middle area
410 Outer sleeve side wall
412 Outer sleeve annular center rib
414 Engagement notch
500 Stand assembly
502 Fishing Hole
504 Notch
506 Light
508 Power supply
510 Handle
512 Flag
600 Drill Referring now to FIG. 1-6, the present invention features a fishing line management system (100) for fishing line spool (110) storage, winding new fishing line (120) onto a reel, and removing old fishing line (120) from the reel.

In some embodiments, the system (100) comprises a generally cylindrical housing (200) having a hollow cavity (210) with a housing side wall (220) and a housing base (230) located on a housing first end (240). In some embodiments, the housing base (230) comprises a centrally located base aperture (232). In some embodiments, the housing base (230) comprises a fishing line attachment point (234). In some embodiments, the hollow cavity (210) is sized to receive a plurality of fishing line spools (110) inside. In some embodiments, the hollow cavity (210) comprises an internally threaded open housing second end (250) to receiving an externally threaded housing lid (260). In some embodiments, the housing lid (260) comprises a seal (270) for making the cylindrical housing (200) watertight. In some embodiments, the housing lid (260) comprises a housing lid threaded insert (262) centrally located on a housing lid exterior surface (264).

In some embodiments, the cylindrical housing (200) comprises a rod (280) centrally located, in the hollow cavity (210). In some embodiments, the rod (280) is generally parallel with the cylindrical housing side wall (220). In some embodiments, the rod (280) comprises an arbor (282) located on a first rod end (284) for connecting to a drill (600). In some embodiments, the arbor (282) is centrally located on the housing base (230), and projects through the base aperture (232). In some embodiments, the rod (280) comprises an internally threaded rod cavity (288). In some embodiments, the rod (280) comprises a diameter sized to receive a fishing line spool (110).

In some embodiments, the system (100) comprises a line spool holder (300) having a line spool holder shaft (310) with a line spool holder shaft first end (312), and a line spool holder shaft second end (314) In some embodiments, the line spool holder shaft (310) comprises an outer diameter equal to the rod (280). In some embodiments, the line spool holder shaft first end (312) comprises a line spool holder threaded rod (316). In some embodiments, the line spool holder threaded rod first end comprises an eyelet (318) for receiving fishing line (120). In some embodiments, the line spool holder shaft second end (314) comprises a shoulder (320). In some embodiments, the shoulder (320) or the line spool holder shaft (310) comprises a weight (322) inside.

In some embodiments, the line spool holder threaded rod (316) can be inserted into the housing lid threaded insert (262) for holding a fishing line spool (110). In some embodiments, the line spool holder threaded rod (316) can be inserted into the internally threaded rod cavity (288) for retaining one or more fishing line spools (110) on the rod (280) in the hollow cavity (210). In some embodiments, the eyelet (318) can be threaded with and attached to a fishing line first end (122). In some embodiments, a fishing line second end (124) is attached to the fishing line attachment point (234). In some embodiments, the line spool holder (300) can be used as an anchor and lowered into the water when using the cylindrical housing (200) as a buoy marker.

In some embodiments, the system (100) comprises a generally cylindrical flexible outer sleeve (400) having an outer sleeve side wall (410). In some embodiments, the outer sleeve (400) comprises a first outer sleeve open end (402) and a second outer sleeve open end (404). In some embodiments, the outer sleeve (400) comprises an outer sleeve annular center rib (412) located between the first outer sleeve open end (402) and the second outer sleeve open end (404). In some embodiments, the outer sleeve annular center rib (412) traverses an outer sleeve middle area (406) perpendicular to the outer sleeve side wall (410). In some embodiments, an engagement notch (414) keeps the outer sleeve (400) from rotating independently from the cylindrical housing (200).

In some embodiments, the outer sleeve (400) is for receiving fishing line (120) from a fishing pole. In some embodiments, the fishing line (120) can be removed from the outer sleeve (400) via removal of the outer sleeve (400) from the cylindrical housing (200) and collapsing the outer sleeve (400) to loosen the tension exerted on the fishing line (120) by the outer sleeve (400).

In some embodiments, the rod (280) comprises a diameter of about ½ inch.

In some embodiments, the system (100) comprises a stand assembly (500) for ice fishing. In some embodiments, the stand assembly (500) includes a fishing hole (502) for lowering a fishing line through and into the water. In some embodiments, the stand assembly (500) includes notches (504) for receiving handles (510) located on the cylindrical housing (200). In some embodiments, the stand assembly (500) includes a light (506) operatively connected to a power supply (508). In some embodiments, the stand assembly (500) includes a flag (512) located on the cylindrical housing (200) for use as an indicator when ice fishing.

As used herein, the term "about" refers to plus or minus 10% of the referenced number. For example, an embodiment wherein the housing is about 10 inches in width includes a housing that is between 9 and 11 inches in length.

The disclosures of the following U.S. Patents are incorporated in their entirety by reference herein: U.S. Pat. No. D 423,073; U.S. Pat. Pub. No. 2004/0035973; U.S. Pat. No. 6,648,262; U.S. Pat. No. 6,550,712; U.S. Pat. No. 6,398,147; U.S. Pat. No. 6,102,319; U.S. Pat. No. 5,906,329; U.S. Pat. No. 5,376,035; U.S. Pat. No. 4,951,890; U.S. Pat. No. 4,196,864.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A fishing line management system (100) for fishing line spool (110) storage, winding new fishing line (120) onto a reel, and removing old fishing line (120) from the reel, wherein said system (100) comprises:
   (a) a generally cylindrical housing (200) comprising:
      (i) a hollow cavity (210) having a housing side wall (220) and a housing base (230) disposed on a housing first end (240), wherein the housing base (230) comprises a base aperture (232) centrally disposed therein, wherein the housing base (230) comprises a fishing line attachment point (234) disposed thereon, wherein the hollow cavity (210) is sized to receive a plurality of fishing line spools (110) disposed therein, wherein the hollow cavity (210) comprises an internally threaded open housing second end (250) for receiving an externally threaded housing lid (260), wherein the housing lid (260) comprises a seal (270) disposed thereon for making the cylindrical housing (200) watertight, wherein the housing lid (260) comprises a housing lid threaded insert (262) centrally disposed on a housing lid exterior surface (264), and
      (ii) a rod (280) centrally disposed in the hollow cavity (210), wherein the rod (280) is generally parallel with the cylindrical housing side wall (220), wherein the rod (280) comprises an arbor (282) disposed on a first rod end (284), wherein the arbor (282) is disposed centrally on the housing base (230) and projects through the base aperture (232), wherein the rod (280) comprises an internally threaded rod cavity (288), wherein the rod (280) comprises a diameter sized to receive a fishing line spool (110);
   (b) a line spool holder (300) having a line spool holder shaft (310) with a line spool holder shaft first end (312), and a line spool holder shaft second end (314), wherein the line spool holder shaft (310) comprises an outer diameter equal to the rod (280), wherein the line spool holder shaft first end (312) comprises a line spool holder threaded rod (316) disposed thereon, wherein the line spool holder threaded rod first end comprises an eyelet (318) for receiving fishing line (120), wherein the line spool holder shaft second end (314) comprises a shoulder (320) disposed thereon, wherein the shoulder (320) comprises a weight (322) disposed therein, wherein the line spool holder threaded rod (316) can be threadably inserted into the housing lid threaded insert (262) for holding a fishing line spool (110), wherein the line spool holder threaded rod (316) can be threadably inserted into the internally threaded rod cavity (288) for retaining one or more fishing line spools (110) on the rod (280) in the hollow cavity (210), wherein the eyelet (318) can be threaded with and attached to a fishing line first end (122), wherein a fishing line second end (124) is attached to the fishing line attachment point (234), wherein the line spool holder (300) can be used as an anchor and lowered into the water when using the cylindrical housing (200) as a buoy marker; and (c) a generally cylindrical flexible outer sleeve (400) having an outer sleeve side wall (410), wherein the outer sleeve (400) comprises a first outer sleeve open end (402) and a second outer sleeve open end (404), wherein the outer sleeve (400) comprises an outer sleeve annular center rib (412) disposed between the first outer sleeve open end (402) and the second outer sleeve open end (404), wherein the outer sleeve annular center rib (412) traverses an outer sleeve middle area (406) perpendicular to the outer sleeve side wall (410), wherein the outer sleeve (400) is for receiving fishing line (120) from a fishing pole, wherein the fishing line (120) can be removed from the outer sleeve (400) via removal of the outer sleeve (400) from the cylindrical housing (200) and collapsing the outer sleeve (400) to loosen the tension exerted on the fishing line (120) by the outer sleeve (400).

2. The system (100) of claim 1, wherein the rod (280) comprises a diameter of about ½ inch.

3. The system (100) of claim 1, further comprising a stand assembly (500) for ice fishing.

\* \* \* \* \*